United States Patent
Zhou et al.

(10) Patent No.: US 11,461,239 B2
(45) Date of Patent: Oct. 4, 2022

(54) METHOD AND APPARATUS FOR BUFFERING DATA BLOCKS, COMPUTER DEVICE, AND COMPUTER-READABLE STORAGE MEDIUM

(71) Applicants: HUAZHONG UNIVERSITY OF SCIENCE AND TECHNOLOGY, Hubei (CN); TENCENT TECHNOLOGY (SHENZHEN) COMPANY LIMITED, Guangdong (CN)

(72) Inventors: Ke Zhou, Wuhan (CN); Yu Zhang, Wuhan (CN); Hua Wang, Wuhan (CN); Yong Guang Ji, Wuhan (CN); Bin Cheng, Wuhan (CN)

(73) Assignees: HUAZHONG UNIVERSITY OF SCIENCE AND TECHNOLOGY, Wuhan (CN); TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 122 days.

(21) Appl. No.: 17/038,680

(22) Filed: Sep. 30, 2020

(65) Prior Publication Data

US 2021/0011857 A1 Jan. 14, 2021

Related U.S. Application Data (63) Continuation of application No. PCT/CN2019/105509, filed on Sep. 12, 2019.

(30) Foreign Application Priority Data

Sep. 30, 2018 (CN) .......................... 201811157995.7

(51) Int. Cl.
*G06F 12/121* (2016.01)
*G06F 12/0891* (2016.01)

(52) U.S. Cl.
CPC ........ *G06F 12/121* (2013.01); *G06F 12/0891* (2013.01)

(58) Field of Classification Search
None
See application file for complete search history.

(56) References Cited

U.S. PATENT DOCUMENTS 8,601,217 B2 * 12/2013 Swart .................... G06F 12/121
  711/E12.075
9,892,044 B1 * 2/2018 Wallace ................ G06F 12/121
(Continued)

FOREIGN PATENT DOCUMENTS

| CN | 103440207 A | 12/2013 |
| CN | 107463509 A | 12/2017 |
| CN | 109144431 A | 1/2019 |

OTHER PUBLICATIONS

Extended European Search Report dated Nov. 2, 2021 from the European Patent Office in European Application No. 19866678.6.
(Continued)

*Primary Examiner* — William E. Baughman
(74) *Attorney, Agent, or Firm* — Sughrue Mion, PLLC (57) ABSTRACT

A method and apparatus for caching a data block are provided. The method includes: obtaining, from a terminal, an access request for requesting access to a first data block; determining that the first data block is missed in a cache space of a storage system; detect whether a second data block satisfies a lazy condition, the second data block being a candidate elimination block in the cache space and the lazy condition being a condition for determining whether to delay replacing the second data block from the cache space according to a re-access probability; determining that the
(Continued)

second data block satisfies the lazy condition; and accessing the first data block from a storage space of the storage system and skipping replacing the second data block from the cache space.

20 Claims, 7 Drawing Sheets

(56) References Cited

U.S. PATENT DOCUMENTS

| | | | |
|---|---|---|---|
| 2008/0091880 A1* | 4/2008 | Vishin | G06F 12/0842 711/E12.039 |
| 2008/0155198 A1 | 6/2008 | Factor et al. | |
| 2009/0125465 A1* | 5/2009 | Berg | G06F 11/3616 706/17 |
| 2012/0054445 A1* | 3/2012 | Swart | G06F 12/121 711/E12.022 |
| 2014/0129779 A1* | 5/2014 | Frachtenberg | G06F 12/123 711/136 |
| 2017/0168944 A1* | 6/2017 | van Greunen | G06F 12/128 |
| 2017/0293565 A1* | 10/2017 | Priyadarshi | G06F 12/0811 |
| 2018/0173636 A1* | 6/2018 | Reed | G06F 12/123 |

OTHER PUBLICATIONS

International Search Report of PCT/CN2019/105509 dated Dec. 11, 2019 [PCT/ISA/210].
Written Opinion of PCT/CN2019/105509 dated Dec. 11, 2019 [PCT/ISA/237].
Translation of Written Opinion dated Dec. 11, 2019 from International Searching Authority in International Application No. PCT/CN2019/105509.

\* cited by examiner

METHOD AND APPARATUS FOR BUFFERING DATA BLOCKS, COMPUTER DEVICE, AND COMPUTER-READABLE STORAGE MEDIUM

CROSS-REFERENCE TO RELATED APPLICATION(S)

This application is a continuation of PCT/CN2019/105509, filed on Sep. 12, 2019, and claims priority to Chinese Patent Application No. 201811157995.7, entitled "METHOD AND APPARATUS FOR BUFFERING DATA BLOCKS, COMPUTER DEVICE, AND COMPUTER-READABLE STORAGE MEDIUM" filed with the China National Intellectual Property Administration on Sep. 30, 2018, the disclosures of which are incorporated by reference herein in their entireties.

BACKGROUND

1. Field

Embodiments of the disclosure relate to the field of storage technologies, and in particular, to a method and an apparatus for caching a data block, a computer device, and a computer-readable storage medium.

2. Description of Related Art

A data storage system includes a storage space and a cache space. The storage space stores a full data block. The cache space is used for temporarily storing a frequently accessed hot data block. The hot data block is a subset of the full data block.

In the data storage system, a hot data block is moved into or out of the cache space based on a caching algorithm. When the cache space is full, after a data block is read from the storage space based on the caching algorithm, a new hot data block is exchanged with an old hot data block in the cache space.

In a typical scenario, re-access to many hot data blocks only occurs after a long time. That is, some of the hot data blocks may be stale in the cache space when they are re-accessed after a long time. If the caching algorithm is simply to replace a hot data block in the cache space, a newly stored hot data block may be repetitive and consume additional space in the cache space. As a result, the efficiency of using the cache space may be lowered.

SUMMARY

According to various embodiments of the disclosure, a method and an apparatus for caching a data block, a computer device, and a computer-readable storage medium are provided.

According to an embodiment, there is provided a method for caching a data block, performed by a computer device, the method including: obtaining, from a terminal, an access request for requesting access to a first data block; determining that the first data block is missed in a cache space of a storage system; detecting whether a second data block satisfies a lazy condition, the second data block being a candidate elimination block in the cache space and the lazy condition being a condition for determining whether to delay replacing the second data block from the cache space according to a re-access probability; determining that the second data block satisfies the lazy condition; and accessing the first data block from a storage space of the storage system and skipping replacing the second data block from the cache space.

According to an embodiment, there is provided an apparatus for caching a data block, including: at least one memory configured to store computer program code; at least one processor configured to access the at least one memory and operate as instructed by the computer program code. The computer program code includes: acquisition code configured to cause the at least one processor to obtain, from a terminal, an access request for requesting access to a first data block; detection code configured to cause the at least one processor to, determine that the first data block is missed in a cache space of a storage system; detect whether a second data block satisfies a lazy condition, the second data block being a candidate elimination block in the cache space and the lazy condition being a condition for determining whether to delay replacing the second data block from the cache space according to a re-access probability; and access code configured to cause the at least one processor to determine that the second data block satisfies the lazy condition; and access the first data block from a storage space of the storage system and skip replacing the second data block from the cache space.

According to an embodiment, there is provided a non-transitory computer-readable storage medium storing computer program code to cause at least one processor to: obtain, from a terminal, an access request for requesting access to a first data block; determine that the first data block is missed in a cache space of a storage system; detect whether a second data block satisfies a lazy condition, the second data block being a candidate elimination block in the cache space and the lazy condition being a condition for determining whether to delay replacing the second data block from the cache space according to a re-access probability; determine that the second data block satisfies the lazy condition; and access the first data block from a storage space of the storage system and skipping replacing the second data block from the cache space.

Additional aspects, features, and advantages of the disclosure will become more apparent from the following description taken in conjunction with the accompanying drawings.

BRIEF DESCRIPTION OF THE DRAWINGS

To describe the technical solutions of the embodiments of the disclosure more clearly, the following briefly describes the accompanying drawings for describing the embodiments. Apparently, the accompanying drawings in the following description show only some example embodiments of the disclosure, and a person of ordinary skill in the art may still derive other embodiments according to these accompanying drawings without creative efforts.

DESCRIPTION

To make the objectives, technical solutions, and advantages of the disclosure clearer, the following further describes the embodiments of the disclosure in detail with reference to the accompanying drawings.

Hereinafter, some of the terms used in the disclosure will be described.

Lazy eviction may refer to a method that conditionally replaces a second data block (which is also referred to as a candidate elimination block) in a cache space with a first data block in a case that the first data block is missing in the cache space. The term "Lazy" herein is discussed in comparison with a forced replacement of a candidate elimination block in a cache space each time a data block is missing in the cache space in the related art.

A reuse distance may refer to a count of unique data blocks between two consecutive accesses to the same data block or a count of data blocks between two consecutive accesses to the same data block. For example, a sequence of historical accessed data blocks includes: 1-2-4-5-4-3-3-2. The reuse distance of a data block 2 is 3 when a manner of counting unique data blocks is used, because the set of unique data blocks between two consecutive accesses to the data block is {3, 4, 5}. The reuse distance of the data block is 5 when a manner of counting data blocks is used. Consecutive accesses are also referred to as re-accesses and are an event that the same data block is accessed again.

In a storage system, the reuse distance of a data block has huge impact on a cache hit rate. Generally, different storage systems have different reuse distance features. For example, in a conventional on-chip cache environment, the average reuse distance may be far shorter than that in a cloud block storage system.

An index table may refer to a data structure that is used for accelerating data search. A common index table structure includes a B-tree, a B+ tree, a hash table, a red-black tree and etc.

The term "hit" may refer to a situation in which, when a data block is accessed, if the data block is present in a cache space, it is considered that the data block is hit in the cache space.

Figure 1:
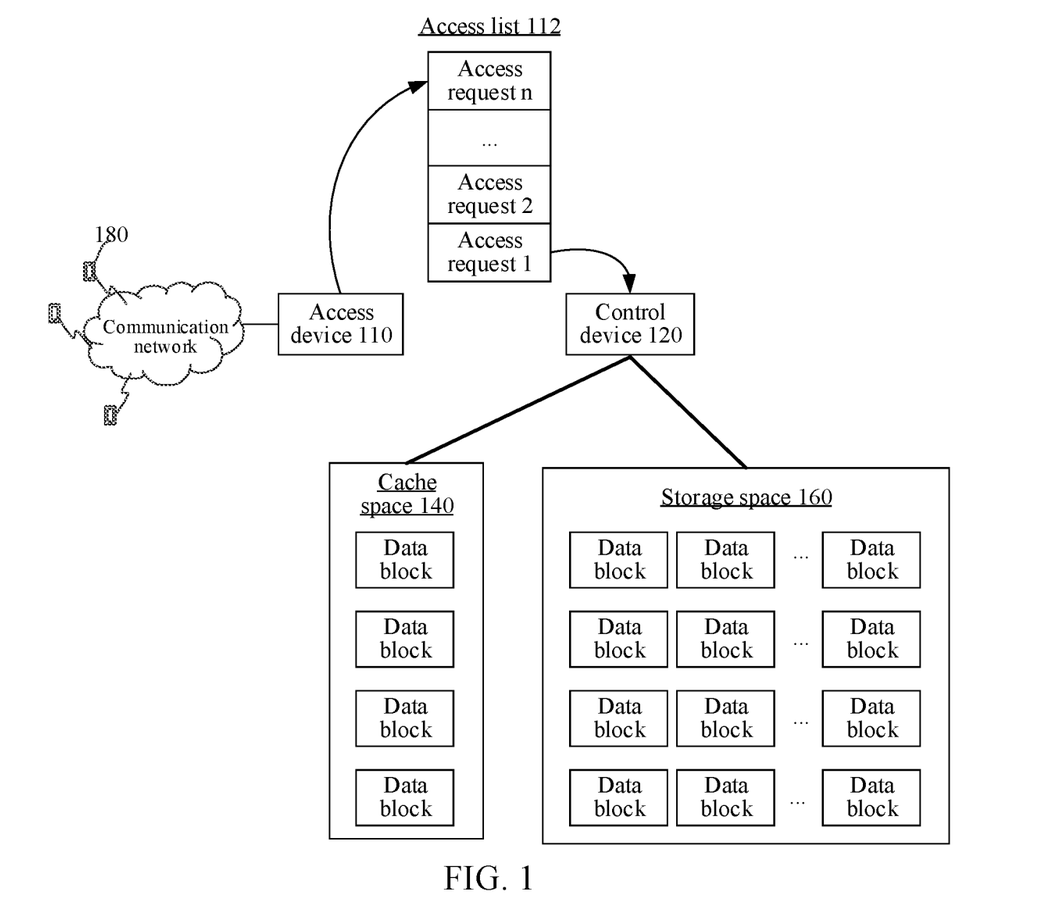
FIG. 1 is a schematic structural diagram of a storage system according to an embodiment.

FIG. 1 is a structural block diagram of a storage system 100 according to an embodiment. The storage system 100 includes a control device 120, a cache space 140, and a storage space 160.

The control device 120 is a computer device configured to control the cache space 140 to store a frequently accessed data block. Here, a caching algorithm may run on the control device 120, and the caching algorithm is used for implementing the method for caching a data block provided according to the embodiments.

The cache space 140 is a storage logic unit configured to cache the frequently accessed data block in the storage space 160. Typically, the read and write performance of the cache space 140 is better than that of the storage space 160. The cache space 140 is constructed by using a non-volatile cache device. The non-volatile cache device includes: a solid state drive (SSD), a phase-change memory (PCM), a shared transistor technology magnetic random access memory (STT-MRAM), a resistive RAM (ReRAM), and etc.

The storage space 160 is a storage logic unit configured to store a full data block. The storage space 160 may be constructed by using a non-volatile storage device. A common non-volatile storage device is a hard disk drive. A plurality of storage volumes may be configured in the storage space 160. Each storage volume stores a plurality of data blocks. The sizes of data blocks may be the same or different. For example, the size of a data block may be 4 KB, 8 KB, 16 KB or 32 KB. Each storage volume corresponds to a respective volume identity (ID). Each data block corresponds to one respective block ID.

In some embodiments, the storage system 100 further includes an access device 110. The access device 110 is configured to receive access requests for data blocks transmitted by the terminals 180, and store the access requests in a request list 112 in a forward order based on receiving time.

For example, each client 180 may transmit an access request for a data block to the access device 110. The access request for a data block may be a read request or a write request. The control device 120 accesses the data blocks in the cache space 140 and the storage space 160 according to the access request. When the data block is hit in the cache space 140, the control device 120 preferentially accesses the data block from the cache space 140. When the data block is missed or not hit in the cache space 140, the control device 120 accesses the data block from the storage space 160.

In the related art, if a client transmits a request for access to a data block to a storage system and the data block is missed in a cache space, the caching algorithm moves each missed data block from a storage space into the cache space (if the cache space is full, a corresponding candidate elimination block needs to be moved out of the cache space). However, according to such method, each missed data block is simply replaced with other existing data block in the cache space, causing some data blocks with low re-access probabilities to be moved into the cache space. As a result, the cache space is consumed with data blocks with low re-access frequency. These data blocks may never be hit in the future.

In addition, because a novel non-volatile cache medium has a feature of limiting a quantity of write times, the lifespan of the cache medium is exhausted when a quantity of write times reaches a particular number. When the cache space is constructed by using the novel non-volatile cache medium, the lifespan of the cache medium is exhausted quickly with the foregoing caching algorithm.

The embodiments of the disclosure provide a technical solution to maintain valuable data blocks in a cache space. The method for caching a data block provided in the embodiments may be applied to a storage system with a cache space and a storage space. Typically, the storage system is a cloud block storage system. The cloud block storage system provides users with a flexible block-level cloud storage service. The cloud block storage system simultaneously serves tens of thousands of users having large amount of working loads.

Figure 2:
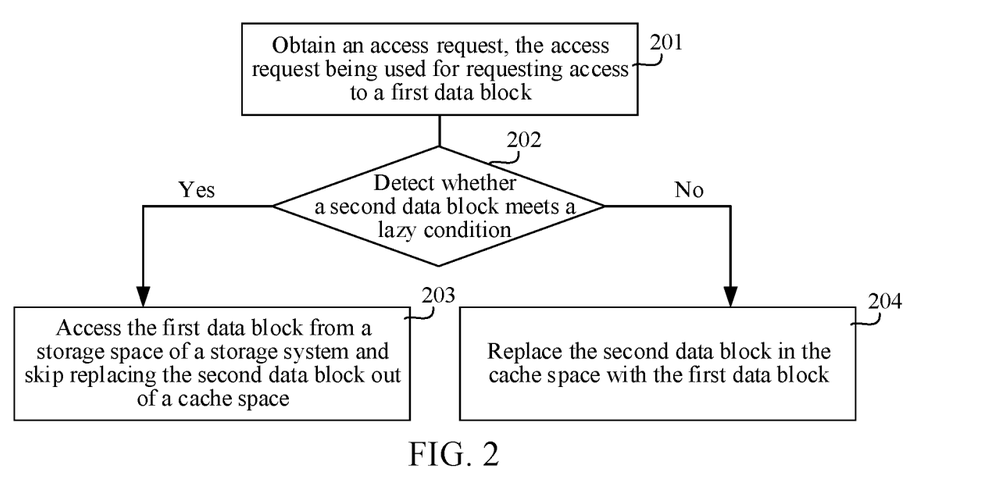
FIG. 2 is a flowchart of a method for caching a data block according to an embodiment.

FIG. 2 is a flowchart of a method for caching a data block according to an embodiment. This embodiment is described by using an example of the storage system shown in FIG. 1 in which the method is applied. The method may include the following steps.

Step 201: Obtain, from a terminal, an access request, the access request requesting an access to a first data block.

A control device reads an access request from a request list. The request list stores a plurality of access requests in sequence. For example, the control device reads the access request with the earliest receiving time from the request list. The access request is used for requesting access to the first data block.

Specifically, the access request carries identifier information of the first data block. The identifier information includes a volume ID and a block ID or includes only a block ID. The control device detects, according to the identifier information, whether the first data block is present in a cache space.

When the first data block is hit in the cache space, the control device accesses the first data block from the cache space. When the first data block is missed in the cache space of the storage system, step 202 is performed.

Step 202: Detect whether a second data block satisfies a lazy condition.

The second data block is a candidate elimination block in the cache space. The lazy condition is a condition for determining, according to a re-access probability, to delay replacing the second data block out of the cache space.

For example, when a list is used to store all data blocks in the cache space in sequence according to a re-access probability, the second data block is the data block located at the list tail. That is, the second data block is the data block with the lowest re-access probability among all data blocks in the cache space.

The lazy condition is also referred to as a lazy eviction condition. The lazy condition may be a condition for determining, according to the re-access probability of the second data block, whether to delay replacing the second data block out of the cache space. Specifically, the lazy condition may be a condition for determining to delay replacing the second data block out of the cache space when the re-access probability of the second data block is higher than an expected threshold. Furthermore, the lazy condition may be a condition for determining the re-access probability of the second data block according to a re-access score and/or a reuse distance of the second data block and determining, according to the re-access probability of the second data block, whether to delay replacing the second data block out of the cache space.

Step 203: Access the first data block from a storage space of the storage system and skip replacing the second data block out of the cache space in a case that the second data block meets the lazy condition.

If the second data block meets the lazy condition, it indicates that the re-access probability of the second data block is higher than a predetermined threshold, the control device reads the first data block from the storage space, and temporarily skips replacing the second data block out of the cache space.

Step 204: Replace the second data block in the cache space with the first data block in a case that the second data block does not satisfy the lazy condition.

If the second data block does not meet the lazy condition, it indicates that the re-access probability of the second data block is relatively low. After reading the first data block from the storage space, the control device replaces the second data block in the cache space with the first data block.

Based on the above, in the method provided in this embodiment, it is detected whether the second data block meets the lazy condition in a case that the first data block is missed in the cache space, and the first data block is read from the storage space and replacing the second data block out of the cache space is temporarily skipped in a case that the second data block meets the lazy condition, so that a dwell time of the second data block in the cache space can be greatly extended, the hit rate of a useful data block can be improved, and the read and write performance of the storage system can be improved.

In the embodiment described with reference to FIG. 2, when the first data block is missed in the cache space, and if the second data block in the cache space meets the lazy condition, the second data block is not replaced out of the cache space, thereby extending the dwell time of the second data block in the cache space. For the first data block that is not replaced into the cache space, the historical access condition of the first data block is recorded by using a data block identifier list (BIL). The first data block stored on the data BIL has a higher probability of being replaced into the cache space during access next time. In this manner, a data block that is more frequently accessed from the cache space can be chosen more efficiently, and an unnecessary write to the cache device can be avoided.

Figure 3:
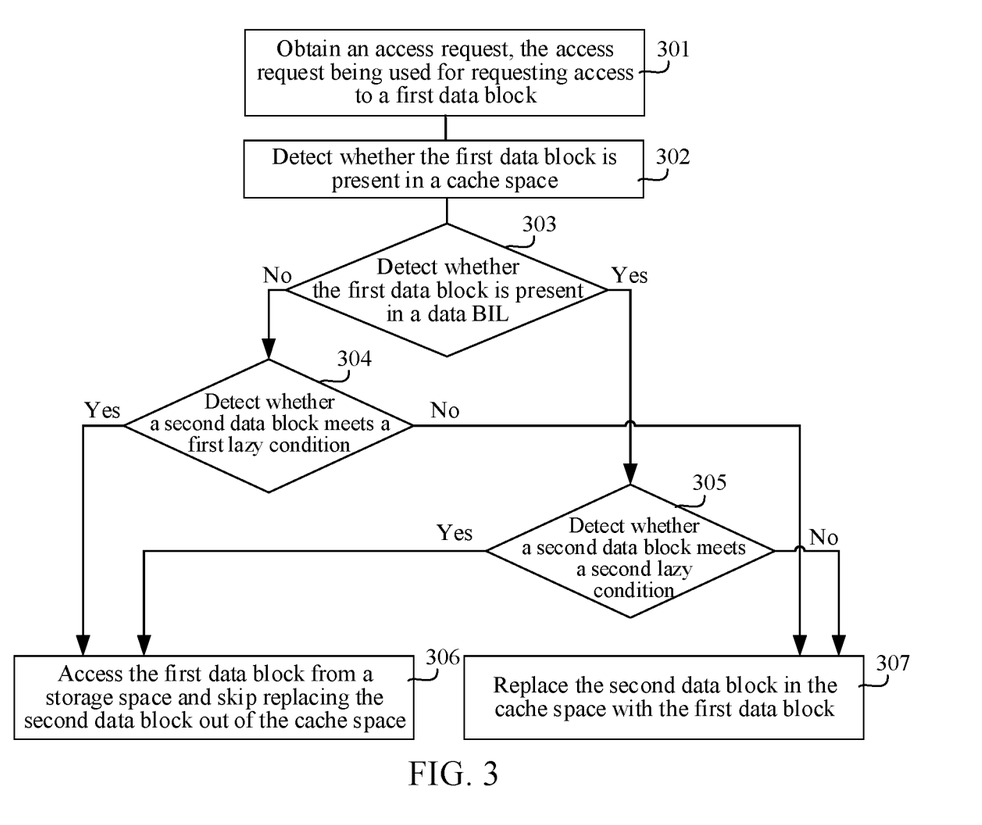
FIG. 3 is a flowchart of a method for caching a data block according to another embodiment.

FIG. 3 is a flowchart of a method for caching a data block according to an embodiment. This embodiment is described by using an example of the control device 120 shown in FIG. 1 in which the method is implemented. The method may include the following steps.

Step 301: Obtain, from a terminal, an access request, the access request being used for requesting access to a first data block.

A control device reads an access request from a request list. The request list stores a plurality of access requests in sequence. For example, the control device reads an $i^{th}$ access request with the earliest receiving time from the request list. The $i^{th}$ access request is used for requesting access to the first data block.

Step 302: Detect whether the first data block is present in a cache space.

The access request carries identifier information of the first data block. The identifier information includes a volume ID and a block ID or includes only a block ID. The control device detects, according to the identifier information, whether the first data block is present in the cache space. If the first data block is present in the cache space, the first data block is hit in the cache space.

When the first data block is hit in the cache space, the control device accesses the first data block in the cache space. When the first data block is missed in the cache space, step 303 is performed.

Step 303: Detect whether the first data block is present in a data block identifier list (BIL).

The data BIL stores block metadata of n historically accessed data blocks. The block metadata includes, but is not limited to, at least one of a block ID of a data block, a volume ID of a storage volume of the data block, the reuse distance of the data block, a flag value of the data block, and a dwell time of the data block in a cache space.

The flag value (also referred to as a re-access score) is a score used for representing the importance of a data block in the dimension of re-access, and is dynamically maintained by a control device according to historical re-access data of the data block. The dwell time is counted according to a quantity of data block access times performed after the data block is stored in the cache space. For example, after a data block 2 is stored in the cache space, the subsequent data block access sequence is 1-2-3-6-7-5-4-7. Here, the dwell time of the data block is 8 because there are eight data blocks "1-2-3-6-7-5-4-7" that are accessed after the data block 2.

The control device queries, according to a block ID of the first data block, whether the first data block is stored in the data BIL. When the first data block is not present in the data BIL, step 304 is performed. When the first data block is present in the data BIL, step 305 is performed.

Two lazy conditions, namely, a first lazy condition and a second lazy condition, are provided in this embodiment. A re-access probability indicated by the first lazy condition is less than a re-access probability indicated by the second lazy condition. That is, the second lazy condition has a stronger limitation than the first lazy condition. A second data block needs to have a larger re-access probability, so as to continue to stay in the cache space. In other words, the second lazy condition may have a predetermined threshold that is higher than a predetermined threshold of the first lazy condition.

Step 304: Detect whether the second data block satisfies the first lazy condition.

For example, the first lazy condition includes a flag value of the second data block that is greater than a first threshold (for example, 0).

When the second data block meets the first lazy condition, the first data block is accessed from the storage space and a replacement of the second data block from the cache space is skipped (step 306). When the second data block does not meet the first lazy condition, the second block in the cache space is replaced with the first data block (step 307).

Step 305: Detect whether the second data block satisfies the second lazy condition.

For example, the second lazy condition may include the following conditions:

1. The flag value of the second data block that is greater than a second threshold (for example, 0).

2. The dwell time of the second data block in the cache space that is greater than K times of a data block average reuse distance. Here, K is a variable parameter that changes with the size of the load of the storage system.

When the second data block meets the second lazy condition, step 306 is performed. When the second data block does not meet the second lazy condition, step 307 is performed.

Step 306: Access the first data block from the storage space and skip replacing the second data block out of the cache space.

The control device 120 accesses the first data block from the storage space and reads or writes the first data block. However, the first data block is temporarily not stored in the cache space and the second data block is not replaced out of the cache space. That is, the second data block is maintained in the cache space for caching until there is another data block that satisfies the first lazy condition or the second lazy condition.

Step 307: Replace the second data block in the cache space with the first data block.

The control device 120 accesses the first data block from the storage space and reads or writes the first data block. The second data block is simultaneously moved out of the cache space, and the first data block is stored in the cache space for caching.

Next, the control device updates block metadata of corresponding data blocks.

Based on the above, in the method provided in this embodiment, two lazy conditions are provided, and a re-access probability of a data block is determined. When the first data block is present in the data BIL, the first data block has a higher probability of being replaced into the cache space, so that a more valuable data block is stored in the cache space, thereby reducing the probability that the data block in the cache space is replaced out of the cache space, improving the utilization of the cache space, and reducing the quantity of write times of the cache space.

In the embodiment described with reference to FIG. 3, the storage system provides two lists, namely, a lazy eviction list (LEL) and a data BIL.

The LEL is used for storing an entity of a data block located in a cache space and block metadata. The entity of the data block is data of the data block. The block metadata is metadata used for describing a data block, and includes, but is not limited to, at least one of a block ID of the data block, a volume ID of a storage volume of the data block, the reuse distance of the data block, a flag value of the data block, and a dwell time of the data block in a cache space.

The block ID is used for uniquely identifying a data block in the entire storage system or the storage volume in which the block ID is located. The block ID may be represented by using at least one type of numbers, letters, and characters.

The volume ID is used for uniquely identifying a storage volume in the entire storage system.

The reuse distance is a count of unique data blocks (or data blocks) between two consecutive accesses to the same data block.

The flag value (also referred to as a re-access score) is a score used for representing the importance of a data block in the dimension of re-access, and is dynamically maintained by a control device according to historical re-access data of the data block. In an embodiment, the flag value is increased according to a first amplitude in a case that one data block is hit in a cache space, and the flag value is decreased according to a second amplitude in a case that one data block is used as a candidate elimination block in a cache space, and meets a lazy condition and is therefore not replaced.

Here, the first amplitude may be less than the second amplitude. For example, the initial value of a flag is 0. When a data block is hit in a cache space, the flag value is increased by 1. When the data block is used as a candidate elimination block, but meets the lazy condition and is therefore not replaced out of the cache space, the flag value is halved.

The dwell time is counted according to a quantity of data block access times performed after the data block is stored in the cache space. For example, after a data block 2 is stored in the cache space, the subsequent data block access sequence is 1-2-3-6-7-5-4-7. Therefore, the dwell time of the data block is 8.

The data BIL is used for storing n historically accessed data blocks. The data BIL is a shadow linked list and may only store block metadata information such as a volume ID and a block ID of a data block, but does not need to store an entity of the data block.

Furthermore, the LEL and the data BIL may have the same list length. Both the LEL and the data BIL include two ends, namely, the list head and the list tail. The data block is always inserted into the list from the list head and is deleted from the list tail.

Figure 4:
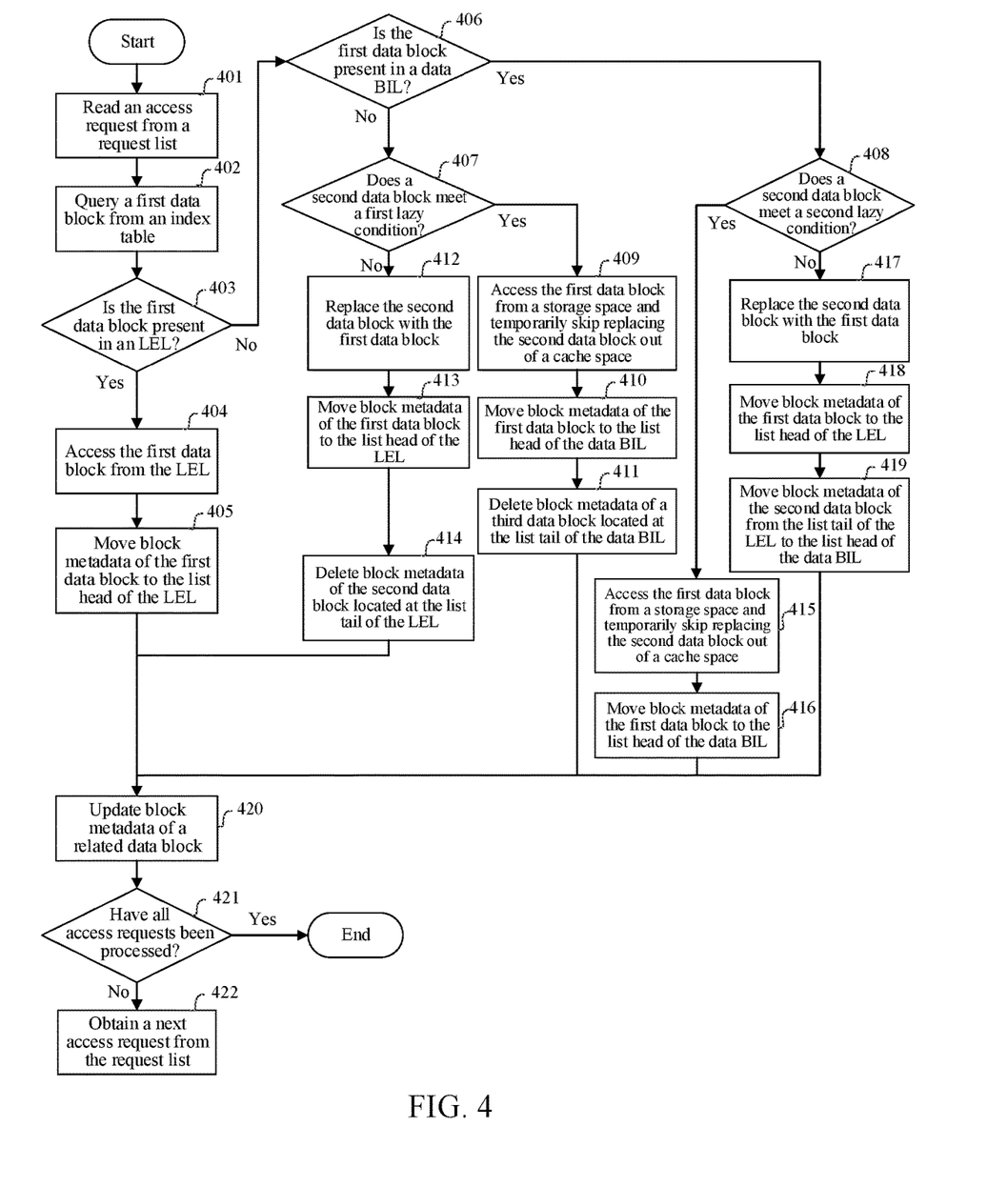
FIG. 4 is a flowchart of a method for caching a data block according to yet another embodiment.

FIG. 4 is a flowchart of a method for caching a data block according to another embodiment. This embodiment is described by using an example of a control device of the storage system shown in FIG. 1 in which the method is applied. The method may include the following steps.

Step 401: Read an access request from a request list, the access request being used for requesting access to a first data block.

The control device reads an access request from the request list. The request list stores a plurality of access requests in sequence. For example, the control device reads an access request from the request list, for example, the access request with the earliest receiving time. The access request is used for requesting access to the first data block.

The access request carries identifier information of the first data block. The identifier information includes a volume ID and a block ID or includes a block ID. This embodiment is described by using an example in which a volume ID and a block ID are used for uniquely identifying a data block.

Step 402: Query the first data block from an index table.

The index table stores a volume ID and a block ID of each data block and a link pointer of the data block. The link pointer of the data block may point to an LEL or a data BIL.

Figure 5:
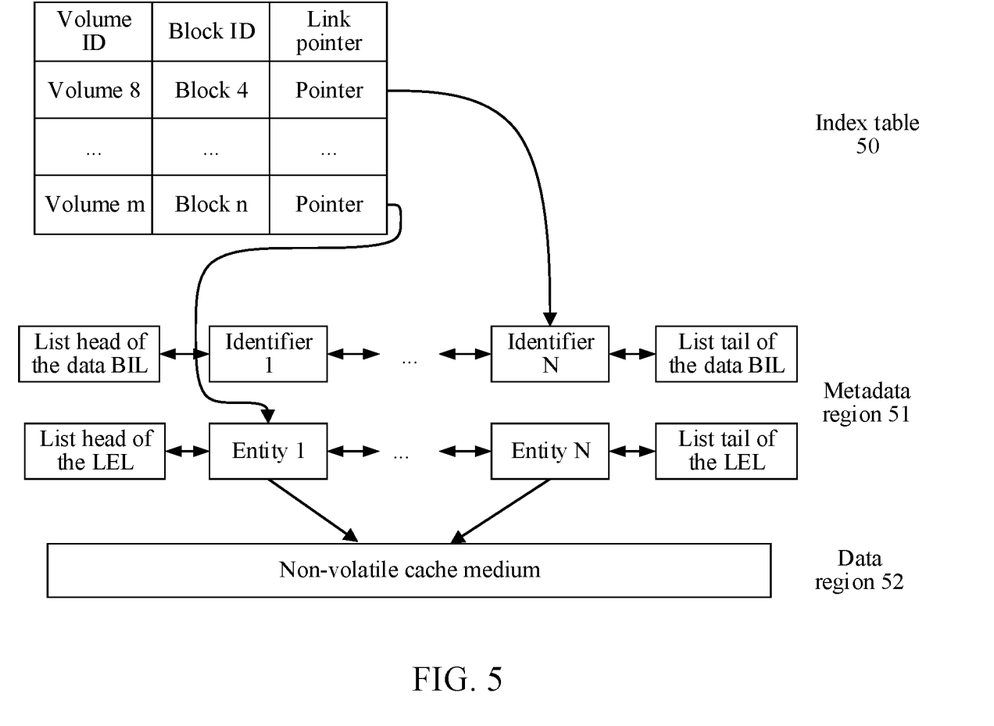
FIG. 5 is a schematic structural diagram of an index table, a metadata region, and a data region according to an embodiment.

For example, referring to FIG. 5, a cache space stores an index table 50, a metadata region 51, and a data region 52. The index table 50 stores a volume ID, a block ID, and a link pointer of each data block. When a data block is present in an LEL, the link pointer points to a list element of the LEL. When the data block is present in a data BIL, the link pointer points to a list element of the data BIL. A list is a data structure. Data to be moved into the list enters the list from the list head, and data to be moved out of the list is moved out from the list tail. In other embodiments, the LEL and the data BIL may use a data structure of a queue. However, this is not limited to this embodiment.

For example, a block n in a volume m is located in the list head of the LEL. That is, the block n is present in the LEL. A block 4 in a volume 8 is located at the list tail of the data BIL. That is, the block 4 is present in the data BIL.

The LEL stores block metadata of each data block and a pointer (which may be considered as an entity of the data block) in a data region 52 of each data block. The data BIL stores the block metadata of each data block.

Data content of each data block is stored in the data region 52.

The control device queries storage information of the first data block in the index table according to a volume ID and a block ID of the first data block.

Step 403: Determine whether the first data block is present in the LEL.

The control device determines whether the link pointer of the first data block points to a list element of the LEL.

When the first data block is present in the LEL, it is considered that the first data block is hit in a cache space, and the first data block is accessed from the LEL (step 404). When the first data block is not present in the LEL, it is considered that the second data block is missed in a cache space, and it is further determined whether the first data block is present in the data BIL (step 406).

Step 404: Access the first data block from the LEL.

Because the cache space stores the first data block, the control device obtains a storage location of the first data block in the data region from the LEL, and reads or writes the first data block according to the storage location.

Step 405: Move block metadata of the first data block to the list head of the LEL.

When the control device determines that the first data block is hit in the cache space, the control device also moves the block metadata of the first data block to the list head of the LEL and reduces the probability that the first data block is replaced out of the cache space.

Step 406: Detect whether the first data block is present in the data BIL.

When the first data block is not hit in the cache space, the control device determines whether the link pointer of the first data block points to a list element of the data BIL.

When the first data block is not present in the data BIL, it indicates that the first data block is a data block accessed for the first time within a recent period of time. In such case, a relatively loose first lazy condition may be used to perform a lazy eviction evaluation on the second data block located at the list tail of the LEL, and step 407 is performed. Here, the recent period of time may be preset or set by a user.

When the first data block is present in the data BIL, it indicates that the first data block is a data block historically accessed within a recent period of time, and a relatively strict second lazy condition may be used to perform a lazy eviction evaluation on the second data block located at the list tail of the LEL, thereby increasing the probability that the first data block is replaced into the cache space, and step 408 is performed.

Step 407: Detect whether the second data block satisfies the first lazy condition.

For example, the first lazy condition includes that a flag value of the second data block that is greater than a first threshold (for example, 0).

When the second data block meets the first lazy condition, step 409 is performed. When the second data block does not meet the first lazy condition, step 412 is performed.

Step 408: Detect whether the second data block satisfies the second lazy condition.

For example, the second lazy condition includes a flag value of the second data block that is greater than a second threshold (for example, 0), and a dwell time of the second data block in the LEL that is greater than K times of a block average reuse distance, where K is a variable parameter that may be changed with the load of the storage system. For example, when the load is relatively heavy, K is increased to reduce the quantity of replacement times. When the load is relatively light, K is reduced to increase the quantity of replacement times.

When the second data block meets the second lazy condition, step 415 is performed. When the second data block does not meet the second lazy condition, step 417 is performed.

Step 409: Access the first data block from the storage space and temporarily skip replacing the second data block out of the cache space.

The control device reads the first data block from or writes the first data block into the storage space, and skips inserting the first data block into the LEL, that is, temporarily skips replacing the second data block out of the cache space with the first data block.

Step 410: Move the block metadata of the first data block to the list head of the data BIL.

The control device also inserts the block metadata of the first data block at the list head of the data BIL, thereby recording the access to the first data block in the data BIL.

Step 411: Delete block metadata of a third data block located at the list tail of the data BIL.

The control device also deletes the block metadata of the third data block from the list tail of the data BIL, thereby ensuring that a total quantity of list elements of the data BIL is n.

Step 412: Replace the second data block with the first data block.

The control device replaces the second data block with the first data block in the LEL. That is, the first data block is inserted into the LEL, and the second data block is deleted from the LEL.

Step 413: Move the block metadata of the first data block to the list head of the LEL.

After the second data block is replaced with the first data block, the control device inserts the block metadata of the first data block at the list head of the LEL.

Step 414: Delete block metadata of the second data block located at the list tail of the LEL.

The control device further deletes the block metadata of the second data block from the list tail of the LEL, thereby ensuring that a total quantity of list elements of the LEL is n.

Figure 6:
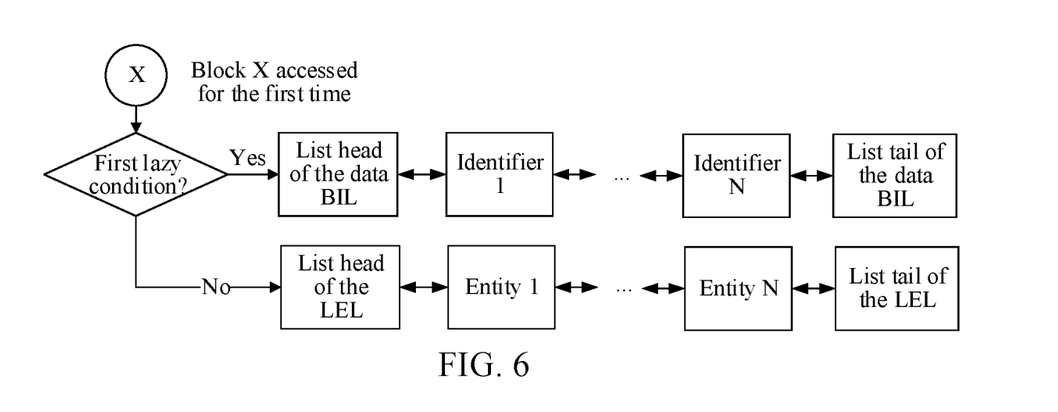
FIG. 6 is a schematic diagram of a first lazy condition according to an embodiment.

Referring to FIG. 6, when the first data block is a block X accessed for the first time, if the second data block meets the first lazy condition, the block metadata of the first data block is inserted at the list head of the data BIL, and if the second data block does not meet the first lazy condition, the block metadata of the first data block is inserted at the list head of the LEL.

Step 415: Access the first data block from the storage space and temporarily skip replacing the second data block out of the cache space.

The control device reads the first data block from or writes the first data block into the storage space, and skips inserting the first data block into the LEL, that is, temporarily skips replacing the second data block out of the cache space with the first data block.

Step 416: Move the block metadata of the first data block to the list head of the data BIL.

When the block metadata of the first data block is already present in the data BIL, the control device moves the block metadata of the first data block to the list head of the data BIL.

Step 417: Replace the second data block with the first data block.

The control device replaces the second data block with the first data block in the LEL, that is, inserts the first data block into the LEL, and deletes the second data block from the LEL.

Step 418: Move the block metadata of the first data block to the list head of the LEL.

After the second data block is replaced with the first data block, the control device inserts the block metadata of the first data block at the list head of the LEL.

Step 419: Move the block metadata of the second data block from the list tail of the LEL to the list head of the data BIL.

The control device also deletes the block metadata of the second data block from the list tail of the LEL, thereby ensuring that a total quantity of list elements of the LEL is n. The control device also inserts the block metadata of the second data block at the list head of the data BIL, thereby ensuring that when the second data block is re-accessed next time, the second data block has a higher probability of being replaced back to the LEL.

Figure 7:
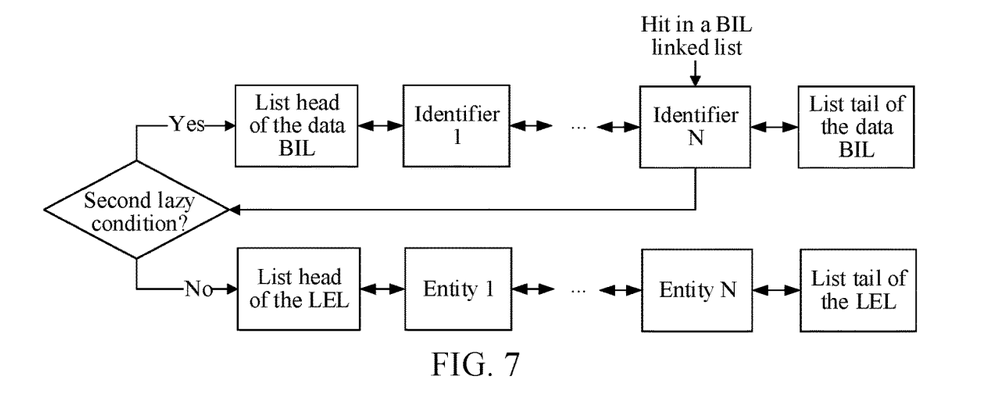
FIG. 7 is a schematic diagram of a second lazy condition according to an embodiment.

Referring to FIG. 7, when the first data block is hit in the data BIL, if the second data block meets the second lazy condition, the block metadata of the first data block is inserted at the list head of the data BIL. If the second data block does not meet the second lazy condition, the block metadata of the first data block is inserted at the list head of the LEL, and the block metadata of the second data block is moved from the list tail of the LEL to the list head of the data BIL.

Step 420: Update block metadata of a related data block.

Each time after the access request for a data block ends, the block metadata of the related data block needs to be updated. The content of update includes, but is not limited to, at least one of the following: the reuse distance of all or some of data blocks, the dwell time of the data blocks located in the cache space, the flag value of the first data block, and the flag value of the second data block.

Furthermore, when the dwell time is represented indirectly by using the last access time, it is only necessary to update the last access time of the first data block.

Step 421: Detect whether all the access requests have been processed.

The control device detects whether all the access requests in the request list have been processed.

If all the access requests have been processed, the process is ended. If there is still an access request to be processed in the request list, step 422 is performed.

Step 422: Obtain a next access request from the request list.

The control device obtains the next access request from the request list and performs step 402 again to process the access request.

Figure 8:
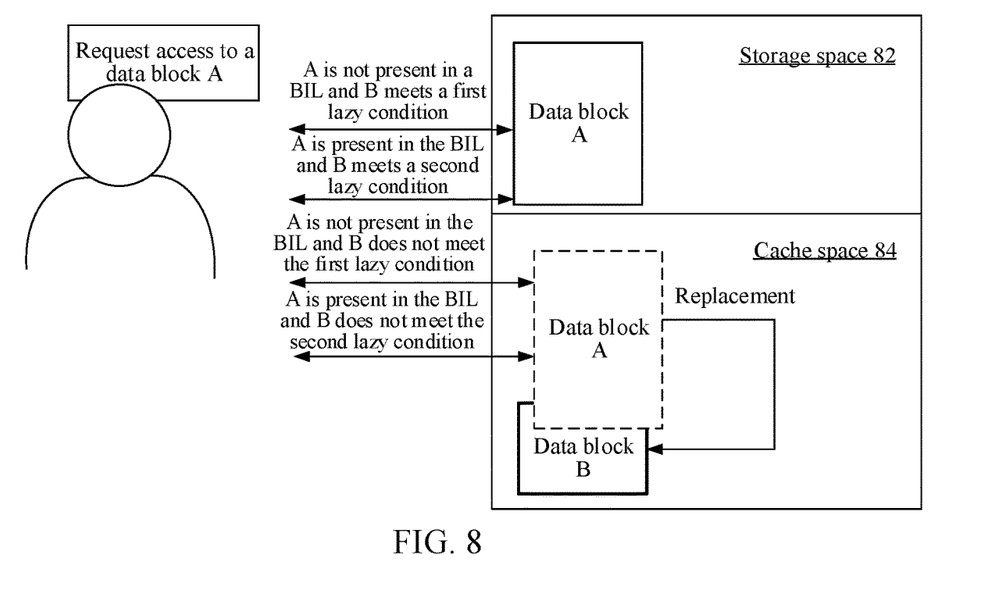
FIG. 8 is a schematic diagram of an implementation of a method for caching a data block according to an embodiment.

As shown in FIG. 8, according to the embodiments described above, two lazy conditions are provided, and a re-access probability of a data block is determined. When the first data block is present in the data BIL, the first data block has a higher probability of being replaced into the cache space, so that a more valuable or frequently accessed data block is stored in the cache space, thereby reducing the probability that the data block in the cache space is replaced out of the cache space, improving the utilization of the cache space, and reducing the quantity of write times of the cache space.

According to an embodiment, when the first data block is a block accessed for the first time and the second data block meets the lazy condition, the block metadata of the first data block is moved into the data BIL, so that the first data block has a higher probability of being replaced into the cache space during access a next time.

When the first data block belongs to the data BIL and the second data block does not meet the lazy condition, the block metadata of the second data block is deleted from the cache space, and is moved to the list head of the data BIL and stored, so that the second data block has a higher probability of being replaced into the cache space during access a next time.

For example, an experimental result shows that, the foregoing caching method can greatly improve the hit rate of the algorithm, thereby improving the read and write performance of the storage system. In addition, the quantity of write times of the cache space can be reduced, thereby extending the service life of the cache space.

In an example, real user data of a cloud block service (CBS) is collected, and a logging-driven experimental method is used. The test result shows that the hit rate is increased by 23.80% by using the algorithm compared with Least Recently Used (LRU) algorithm, and is increased by 15.70% by using the algorithm compared with the Adjustable Replacement Cache (ARC) algorithm or is increased by 9.66% by using the algorithm compared with the ARC algorithm.

In an example, because of features of the lazy eviction, the method can greatly reduce the write to a non-volatile cache device, thereby effectively extending the service life of a cache device. The test result shows that the cache device write flow is reduced by 62.85% by using the algorithm compared with the LRU algorithm and is reduced by 61.85% by using the algorithm compared with the ARC algorithm.

Referring to FIG. 8, when a user requests to access a data block A, and the data block A is present in an LEL, the data block A is accessed directly from a cache space 84. When a data block A is not present in an LEL, it is detected whether the data block A is present in a data BIL and whether a data block B that is located in the cache space 84 and is used as a candidate elimination block meets a lazy condition.

When the data block A is not present in the data BIL, and the data block B that resides in the cache space meets the first lazy condition, the data block A is accessed from a storage space 82.

When the data block A is present in the data BIL, and the data block B that resides in the cache space meets the second lazy condition, the data block A is accessed from the storage space 82.

When the data block A is not present in the data BIL, and the data block B does not meet the first lazy condition, the data block A is read from the storage space 82, and the data block B is replaced in the cache space 84 with the data block A.

When the data block A is present in the data BIL, and the data block B does not meet the first lazy condition, the data block A is read from the storage space 82, and the data block B is replaced in the cache space 84 with the data block A.

FIG. 2 to FIG. 4 are schematic flowcharts of a method for caching a data block according to various embodiments. It is to be understood that although the steps of the flowcharts in FIG. 2 to FIG. 4 are shown sequentially according to arrows, the steps are not necessarily performed in the orders indicated by arrows. Unless explicitly indicated otherwise, these steps are performed without any strict sequence limitation, and may be performed in different sequences. In addition, at least some steps in FIG. 2 to FIG. 8 may include a plurality of substeps or a plurality of stages. The substeps or the stages are not necessarily performed at the same moment, and instead may be performed at different moments. A performing sequence of the substeps or the stages is not necessarily performed in sequence, and instead may be performed in turn or alternately with another step or at least some of substeps or stages of the another step.

The following describes an apparatus that may implement various embodiments described above. For details not described in this embodiment, reference may be made to corresponding record in the foregoing method embodiments.

Figure 9:
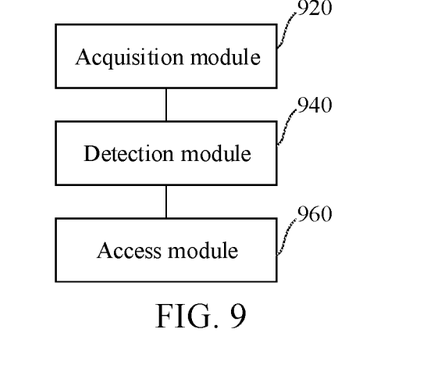
FIG. 9 is a structural block diagram of an apparatus for caching a data block according to an embodiment.

FIG. 9 is a structural block diagram of an apparatus for caching a data block according to an embodiment. The cache device may be implemented as a part of a storage system, or may be applied to the foregoing storage system, for example, may be implemented as a part of a control device.

The apparatus may include an acquisition module 920 configured to obtain an access request, the access request being used for requesting access to a first data block; a detection module 940 configured to detect whether a second data block meets a lazy condition in a case that the first data block is missed in a cache space of a storage system, the second data block being a candidate elimination block in the cache space, the lazy condition being a condition for determining, according to a re-access probability, to delay replacing the second data block out of the cache space; and an access module 960 configured to access the first data block from a storage space of the storage system and skip replacing the second data block out of the cache space in a case that the second data block meets the lazy condition. The access module 960 is further configured to replace the second data block with the first data block in a case that the second data block does not meet the lazy condition.

In an embodiment, the storage system stores a data BIL and the data BIL stores block metadata of n historically accessed data blocks, where n is a positive integer.

The detection module 940 is further configured to detect whether the second data block meets a first lazy condition in a case that the first data block is not present in the data BIL and detect whether the second data block meets a second lazy condition in a case that the first data block is present in the data BIL, Here, a re-access probability indicated by the first lazy condition is less than a re-access probability indicated by the second lazy condition.

In an embodiment, the first lazy condition includes a flag value of the second data block that is greater than a first threshold, the flag value being a variable used for measuring the access importance of the second data block; and the second lazy condition includes a flag value of the second data block that is greater than a second threshold, a dwell time of the second data block in the cache space being greater than K times of a block average reuse distance.

In an embodiment, the flag value is increased according to a first amplitude in a case that the second data block is hit in the cache space, and the flag value is decreased according to a second amplitude in a case that the second data block meets the lazy condition and is therefore not replaced in the cache space.

Figure 10:
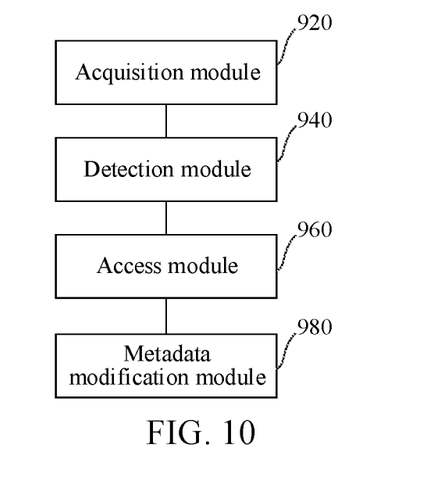
FIG. 10 is a structural block diagram of an apparatus for caching a data block according to an embodiment.

In an embodiment, the apparatus further includes a metadata modification module 980, as shown in FIG. 10.

The metadata modification module 980 is configured to add block metadata of the first data block to the list head of the data BIL in a case that the second data block meets the first lazy condition, delete block metadata of a third data block at the list tail of the data BIL, and move the block metadata of the first data block to the list head of the data BIL in a case that the second data block meets the second lazy condition.

In an embodiment, the storage system includes an LEL that stores block metadata of n data blocks located in the cache space, where n is a positive integer.

The metadata modification module 980 is configured to delete block metadata of the second data block from the list tail of the LEL in a case that the second data block does not meet the first lazy condition.

The metadata modification module 980 is configured to delete the block metadata of the second data block from the list tail of the LEL in a case that the second data block does not meet the second lazy condition, and move the block metadata of the second data block to the list head of the data BIL.

The metadata modification module 980 is configured to move the block metadata of the first data block to the list head of the LEL in a case that the second data block does not meet the lazy condition.

As described above, the lazy condition includes the first lazy condition and the second lazy condition.

Figure 11:
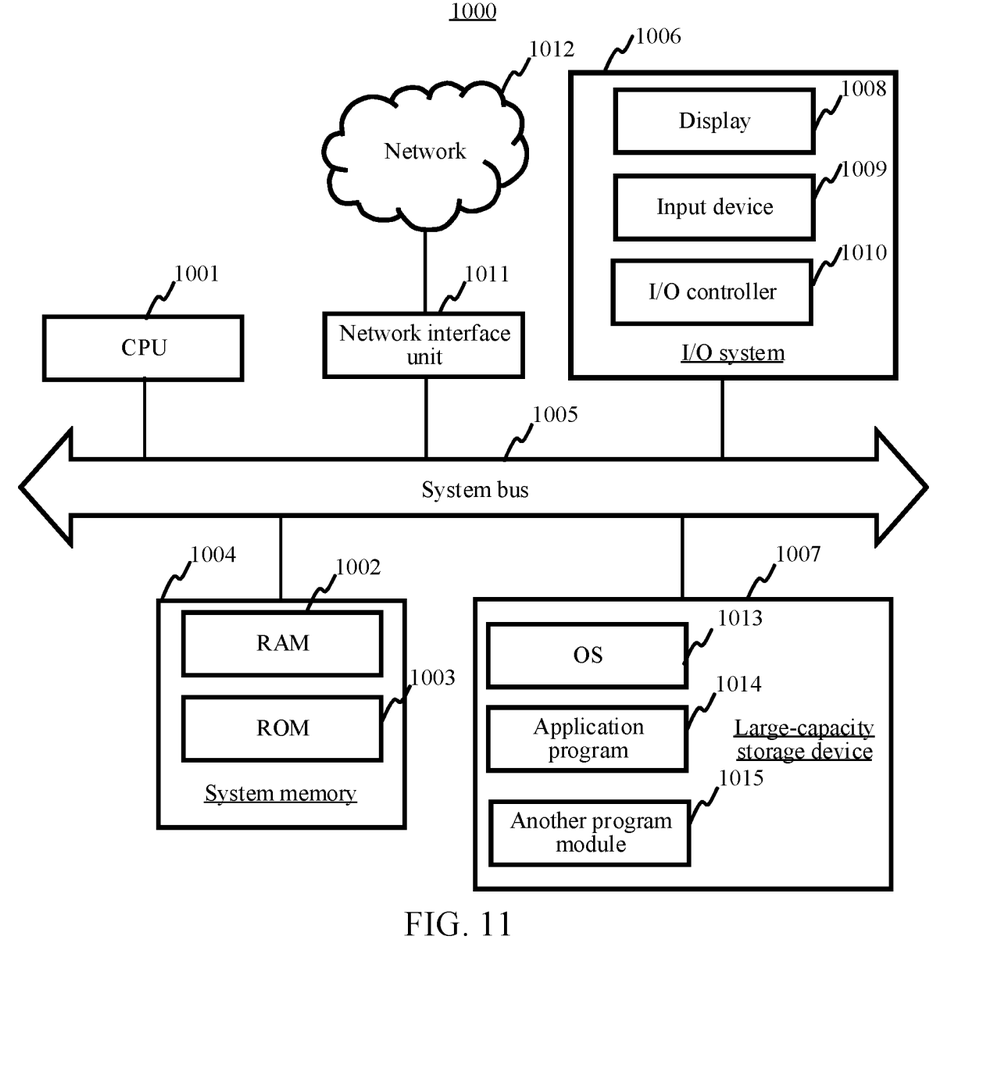
FIG. 11 is a structural block diagram of a computer device according to another embodiment.

FIG. 11 is a schematic structural diagram of a computer device according to an embodiment. Specifically, the computer device 1000 includes a central processing unit (CPU) 1001, a system memory 1004 including a RAM 1002 and a read-only memory (ROM) 1003, and a system bus 1005 connecting the system memory 1004 to the CPU 1001. The computer device 1000 further includes a basic input/output (I/O) system 1006 configured to transmit information between components in the computer, and a large-capacity storage device 1007 configured to store an operating system 1013, an application program 1014, and another program module 1015.

The basic I/O system 1006 includes a display 1008 configured to display information and an input device 1009 such as a mouse or a keyboard used by a user to input information. The display 1008 and the input device 1009 are both connected to the CPU 1001 by an I/O controller 1010 connected to the system bus 1005. The basic I/O system

1006 may further include the I/O controller 1010 to transmit, receive and process inputs from multiple other devices, such as the keyboard, the mouse, or an electronic stylus. Similarly, the I/O controller 1010 further provides an output to a display screen, a printer or another type of output device. However, the I/O system is not limited thereto.

The large-capacity storage device 1007 is connected to the CPU 1001 by using a large-capacity storage controller connected to the system bus 1005. The large-capacity storage device 1007 and an associated computer-readable medium provide non-volatile storage for the computer device 1000. That is, the large-capacity storage device 1007 may include a computer-readable medium, such as a hard disk or a compact disc ROM (CD-ROM) drive.

Without loss of generality, the computer-readable storage medium may include a computer storage medium and a communication medium. The computer storage medium includes volatile and non-volatile, removable and non-removable media that store information such as computer-readable instructions, data structures, program modules or other data and that are implemented by using any method or technology. The computer storage medium includes a RAM, a ROM, an erasable programmable ROM (EPROM), an electrically EPROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, it may be known by a person skilled in the art that the computer storage medium is not limited to the foregoing. The system memory 1004 and the large-capacity storage device 1007 may be generally referred to as a memory.

According to the embodiments, the computer device 1000 may be connected, by a network such as the Internet, to a remote computer on the network. That is, the computer device 1000 may be connected to a network 1012 through a network interface unit 1011 connected to the system bus 1005, or may be connected to another type of network or a remote computer system through the network interface unit 1011.

The processor is configured to load and execute executable code to implement the method for caching a data block provided in the foregoing method embodiments.

Furthermore, a computer-readable storage medium may be provided. The storage medium stores at least one instruction, at least one program, a code set or an instruction set, and the at least one instruction, the at least one program, the code set or the instruction set being loaded and executed by the processor to implement the method for caching a data block provided in the foregoing method embodiments.

A computer program product may be provided according to an embodiment. When the computer program product is loaded and runs on an electronic device, the computer program product causes the electronic device to perform the method for caching a data block provided in the foregoing method embodiments.

The sequence numbers of the foregoing embodiments of the disclosure are merely for the convenience of description, and do not imply the preference among the embodiments.

A person of ordinary skill in the art may understand that all or some of the steps in the foregoing embodiments may be implemented by hardware or software including a program instructing relevant hardware. The program may be stored in a computer-readable storage medium. During execution of the program, processes of the embodiments of the foregoing method may be included. Any reference to a memory, storage, database or another medium used in the embodiments provided in the disclosure may include a non-volatile and/or volatile memory. The non-volatile memory may include a ROM, a programmable ROM (PROM), an EPROM, an EEPROM or a flash. The volatile memory may include a RAM or an external high-speed cache. In addition, the RAM may be available in various forms, such as a static RAM SRAM, a dynamic RAM (DRAM), a synchronous DRAM (SDRAM), a double data rate SDRAM (DDRSDRAM), an enhanced SDRAM (ESDRAM), synchronous link (Synchlink) DRAM (SLDRAM), a rambus direct RAM (RDRAM), a direct rambus dynamic RAM (DRDRAM), and a rambus dynamic RAM (DRAM).

The foregoing descriptions are merely example embodiments of the disclosure, and are not intended to limit the scope of the disclosure. Any modification, equivalent replacement, improvement and the like made within the spirit and principle of the disclosure shall fall within the protection scope of the disclosure.

What is claimed is:

1. A method for caching a data block, performed by a computer device, the method comprising:
   obtaining, from a terminal, an access request for requesting access to a first data block;
   determining that the first data block is missed in a cache space of a storage system, and wherein the storage system stores a data block identifier list (BIL), the data BIL storing block metadata of a plurality of blocks;
   detecting whether a second data block satisfies a lazy condition, the second data block being a candidate elimination block in the cache space and the lazy condition being a condition for determining whether to delay replacing the second data block from the cache space according to a re-access probability;
   determining that the second data block satisfies the lazy condition, adding block metadata of the first data block to a list head of the data BIL based on the second data block satisfying a first lazy condition, and deleting block metadata of a third data block at a list tail of the data BIL; and
   accessing the first data block from a storage space of the storage system and skipping replacing the second data block from the cache space.

2. The method according to claim 1,
   wherein the detecting whether the second data block satisfies the lazy condition comprises:
   determining that the first data block is not present in the data BIL;
   detecting whether the second data block satisfies thea first lazy condition;
   determining that the first data block is present in the data BIL; and
   detecting whether the second data block satisfies a second lazy condition, and
   wherein a re-access probability indicated by the first lazy condition is less than a re-access probability indicated by the second lazy condition.

3. The method according to claim 2, wherein the first lazy condition comprises a flag value of the second data block that is greater than a first threshold, the flag value being a variable used for measuring an access importance of the second data block, and
   wherein the second lazy condition comprises the flag value of the second data block that is greater than a second threshold and a dwell time of the second data block in the cache space, the dwell time being greater than K times of a block average reuse distance, where K>0.

4. The method according to claim 3, further comprising:
increasing the flag value by a first amplitude based on the second data block being hit in the cache space; and
decreasing the flag value by a second amplitude based on the second data block being used as the candidate elimination block and satisfying one of the first lazy condition or the second lazy condition, and not being replaced from the cache space.

5. The method according to claim 2, further comprising:
moving the block metadata of the first data block to the list head of the data BIL based on the second data block satisfying the second lazy condition.

6. The method according to claim 2, further comprising:
replacing the second data block with the first data block based on the second data block not satisfying the first lazy condition or the second lazy condition.

7. The method according to claim 2, wherein the storage system stores a lazy eviction list (LEL), the LEL storing the block metadata of n data blocks located in the cache space, and
wherein the method further comprises:
deleting block metadata of the second data block from a list tail of the LEL based on the second data block not satisfying the first lazy condition; and
deleting the block metadata of the second data block from the list tail of the LEL and moving the block metadata of the second data block to the list head of the data BIL based on the second data block not satisfying the second lazy condition.

8. The method according to claim 2, wherein the storage system stores a lazy eviction list (LEL), the LEL storing the block metadata of n data blocks located in the cache space, and
wherein the method further comprises:
moving block metadata of the first data block to a list head of the LEL based on the second data block not satisfying the first lazy condition.

9. An apparatus for caching a data block, comprising:
at least one memory configured to store computer program code;
at least one processor configured to access the at least one memory and operate as instructed by the computer program code, the computer program code comprising:
acquisition code configured to cause the at least one processor to obtain, from a terminal, an access request for requesting access to a first data block;
detection code configured to cause the at least one processor to determine that the first data block is missed in a cache space of a storage system, wherein the storage system stores a data block identifier list (BIL), the data BIL storing block metadata of a plurality of blocks, and detect whether a second data block satisfies a lazy condition, the second data block being a candidate elimination block in the cache space and the lazy condition being a condition for determining whether to delay replacing the second data block from the cache space according to a re-access probability; and
access code configured to cause the at least one processor to determine that the second data block satisfies the lazy condition, add block metadata of the first data block to a list head of the data BIL based on the second data block satisfying a first lazy condition, delete block metadata of a third data block at a list tail of the data BIL, and access the first data block from a storage space of the storage system and skip replacing the second data block from the cache space.

10. The apparatus according to claim 9,
wherein the detection code is further configured to cause the at least one processor to:
determine that the first data block is not present in the data BIL;
detect whether the second data block satisfies a first lazy condition;
determining that the first data block is present in the data BIL; and
detect whether the second data block satisfies a second lazy condition, and
wherein a re-access probability indicated by the first lazy condition is less than a re-access probability indicated by the second lazy condition.

11. The apparatus according to claim 10, wherein the first lazy condition comprises a flag value of the second data block that is greater than a first threshold, the flag value being a variable used for measuring an access importance of the second data block, and
wherein the second lazy condition comprises the flag value of the second data block that is greater than a second threshold and a dwell time of the second data block in the cache space, the dwell time being greater than K times of a block average reuse distance, where $K>0$.

12. The apparatus according to claim 11, further comprising:
metadata modification code configured to cause the at least one processor to:
increase the flag value by a first amplitude based on the second being hit in the cache space; and
decrease the flag value by a second amplitude based on the second data block being used as the candidate elimination block and satisfying one of the first lazy condition or the second lazy condition, and not being replaced from the cache space.

13. The apparatus according to claim 10, further comprising:
metadata modification code configured to cause the at least one processor to:
move the block metadata of the first data block to the list head of the data BIL based on the second data block satisfying the second lazy condition.

14. The apparatus according to claim 10, wherein the access code is further configured to cause the at least one processor to replace the second data block with the first data block based on the second data block not satisfying the first lazy condition or the second lazy condition.

15. The apparatus according to claim 10, wherein the storage system stores a lazy eviction list (LEL), the LEL storing the block metadata of n data blocks located in the cache space, and
wherein the apparatus further comprises:
metadata modification code configured to cause the at least one processor to:
delete block metadata of the second data block from a list tail of the LEL based on the second data block not satisfying the first lazy condition,
delete the block metadata of the second data block from the list tail of the LEL and move the block metadata of the second data block to the list head of the data BIL based on the second data block not satisfying the second lazy condition.

16. The apparatus according to claim 10, wherein the storage system stores a lazy eviction list (LEL), the LEL storing the block metadata of n data blocks located in the cache space, and
    wherein the apparatus further comprises:
    metadata modification code configured to cause the at least one processor to move block metadata of the first block to a list head of the LEL based on the second data block not satisfying the first lazy condition.

17. A non-transitory computer-readable storage medium storing computer program code to cause at least one processor to:
    obtain, from a terminal, an access request for requesting access to a first data block;
    determine that the first data block is missed in a cache space of a storage system, and wherein the storage system stores a data block identifier list (BIL), the data BIL storing block metadata of a plurality of blocks;
    detect whether a second data block satisfies a lazy condition, the second data block being a candidate elimination block in the cache space and the lazy condition being a condition for determining whether to delay replacing the second data block from the cache space according to a re-access probability;
    determine that the second data block satisfies the lazy condition, add block metadata of the first data block to a list head of the data BIL based on the second data block satisfying a first lazy condition, and delete block metadata of a third data block at a list tail of the data BIL; and
    access the first data block from a storage space of the storage system and skipping replacing the second data block from the cache space.

18. The non-transitory computer-readable storage medium according to claim 17,
    wherein the computer program code is further configured to cause the at least one processor to:
        determine that the first data block is not present in the data BIL;
        detect whether the second data block satisfies a first lazy condition;
        determine that the first data block is present in the data BIL; and
        detect whether the second data block satisfies a second lazy condition, and
    wherein a re-access probability indicated by the first lazy condition is less than a re-access probability indicated by the second lazy condition.

19. The non-transitory computer-readable storage medium according to claim 18, wherein the first lazy condition comprises a flag value of the second data block that is greater than a first threshold, the flag value being a variable used for measuring an access importance of the second data block, and
    wherein the second lazy condition comprises the flag value of the second data block that is greater than a second threshold and a dwell time of the second data block in the cache space, the dwell time being greater than K times of a block average reuse distance, where K>0.

20. The non-transitory computer-readable storage medium according to claim 19, wherein the computer program code is further configured to cause the at least one processor to:
    increase the flag value by a first amplitude based on the second data block being hit in the cache space; and
    decrease the flag value by a second amplitude based on the second data block being used as the candidate elimination block and satisfying one of the first lazy condition or the second lazy condition, and not being replaced from the cache space.

* * * * *